United States Patent
Yamazaki et al.

(10) Patent No.: US 10,315,633 B2
(45) Date of Patent: Jun. 11, 2019

(54) VEHICLE BEHAVIOR CONTROL DEVICE

(71) Applicant: HONDA MOTOR CO., LTD., Tokyo (JP)

(72) Inventors: Daisuke Yamazaki, Saitama (JP); Satoshi Matsushita, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 100 days.

(21) Appl. No.: 15/553,076

(22) PCT Filed: Feb. 26, 2016

(86) PCT No.: PCT/JP2016/055898
§ 371 (c)(1),
(2) Date: Aug. 23, 2017

(87) PCT Pub. No.: WO2016/136968
PCT Pub. Date: Sep. 1, 2016

(65) Prior Publication Data
US 2018/0037201 A1 Feb. 8, 2018

(30) Foreign Application Priority Data
Feb. 27, 2015 (JP) .................. 2015-037653

(51) Int. Cl.
*B60T 8/17* (2006.01)
*B60T 8/1755* (2006.01)
*B60T 8/40* (2006.01)

(52) U.S. Cl.
CPC ........ *B60T 8/17554* (2013.01); *B60T 8/1755* (2013.01); *B60T 8/17555* (2013.01); (Continued)

(58) Field of Classification Search
CPC ............. B60T 8/17554; B60T 8/17558; B60T 8/17555; B60T 8/17557
See application file for complete search history.

(56) References Cited

U.S. PATENT DOCUMENTS

| | | | | |
|---|---|---|---|---|
| 6,027,183 A | * | 2/2000 | Katayose | ............... B60T 8/1755 303/113.5 |
| 2013/0249274 A1 | | 9/2013 | Miyazaki et al. | |
| 2015/0091370 A1 | | 4/2015 | Yamasaki et al. | |

FOREIGN PATENT DOCUMENTS

| | | |
|---|---|---|
| CN | 103237698 A | 8/2013 |
| CN | 104220312 A | 12/2014 |

(Continued)

OTHER PUBLICATIONS

International Search Report, dated Apr. 26, 2016 (Apr. 26, 2016), 1 page.

(Continued)

*Primary Examiner* — Yonel Beaulieu
*Assistant Examiner* — Martin A Weeks
(74) *Attorney, Agent, or Firm* — Rankin, Hill & Clark LLP

(57) ABSTRACT

A vehicle behavior control device is for use in a vehicle including a brake pedal, a master cylinder generating a hydraulic pressure in response to an operation with the brake pedal, an electric hydraulic pressure generator connected to the master cylinder and electrically generating a hydraulic pressure based on the operation with the brake pedal, and a wheel cylinder in each wheel for braking. The device controls a brake hydraulic pressure to be applied to the wheel cylinder to control vehicle behavior. When brake control is executed such that a brake hydraulic pressure not based on the operation with the brake pedal is generated if the brake pedal is not being operated, a hydraulic pressure applied to a wheel cylinder in a diagonal wheel positioned diagonal from a brake wheel for controlling the behavior of the vehicle is adjusted to the hydraulic pressure in the master cylinder.

2 Claims, 3 Drawing Sheets

(52) U.S. Cl.
CPC ...... *B60T 8/17557* (2013.01); *B60T 8/17558* (2013.01); *B60T 8/4081* (2013.01)

(56) References Cited

FOREIGN PATENT DOCUMENTS

| | | |
|---|---|---|
| JP | 8-310365 | 11/1996 |
| JP | 10-203332 | 8/1998 |
| JP | 2005-035444 | 2/2005 |
| JP | 2009-279966 | 12/2009 |

OTHER PUBLICATIONS

Chinese Office Action with English translation dated Feb. 19, 2019, 10 pages.

* cited by examiner

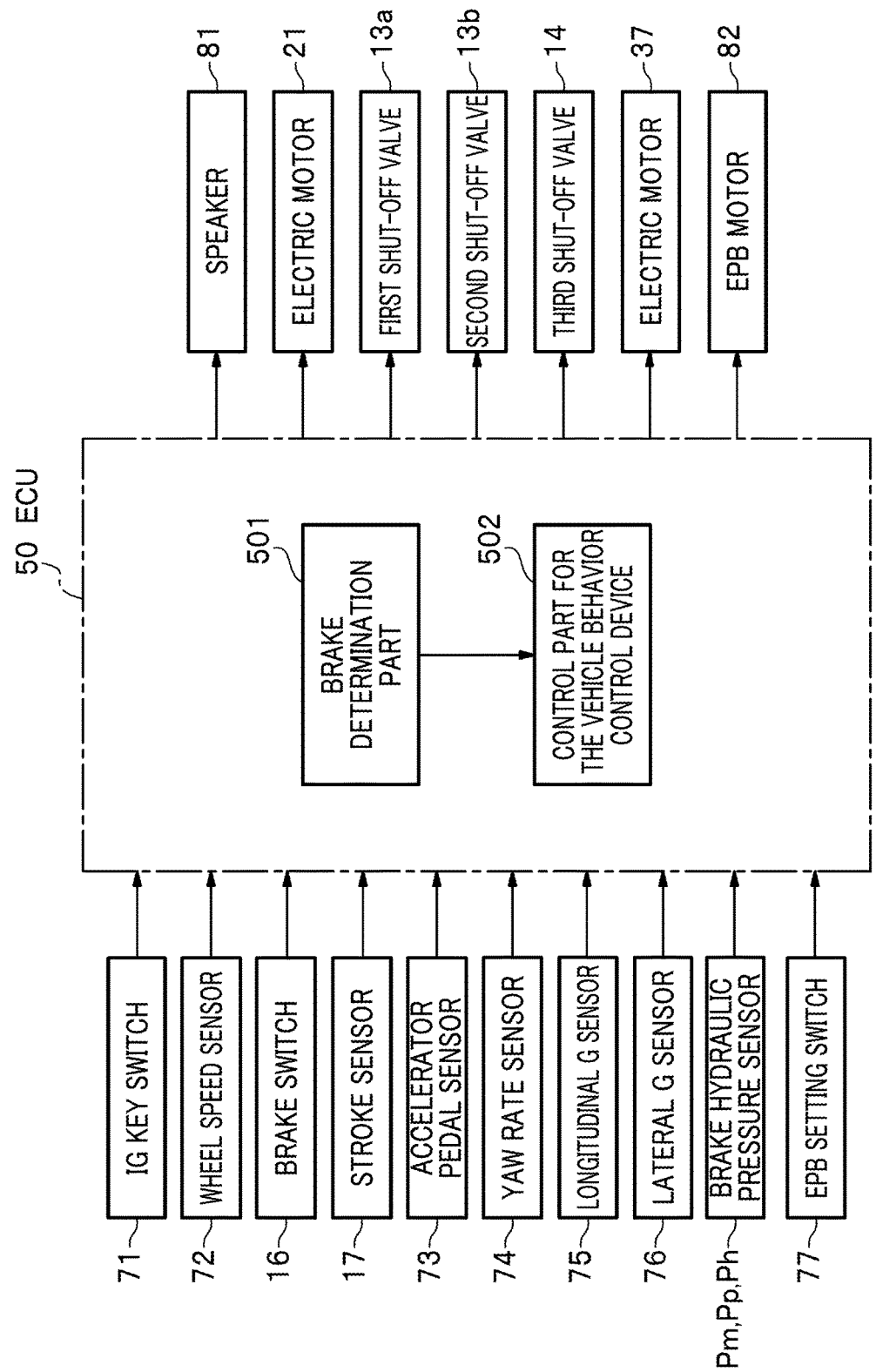

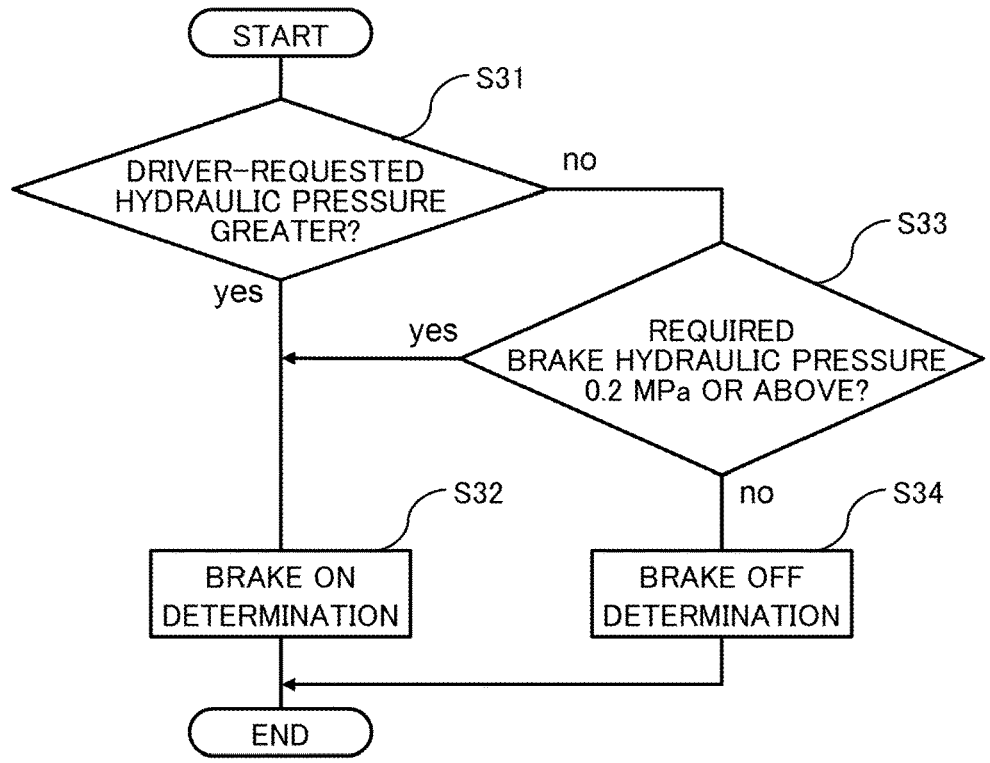
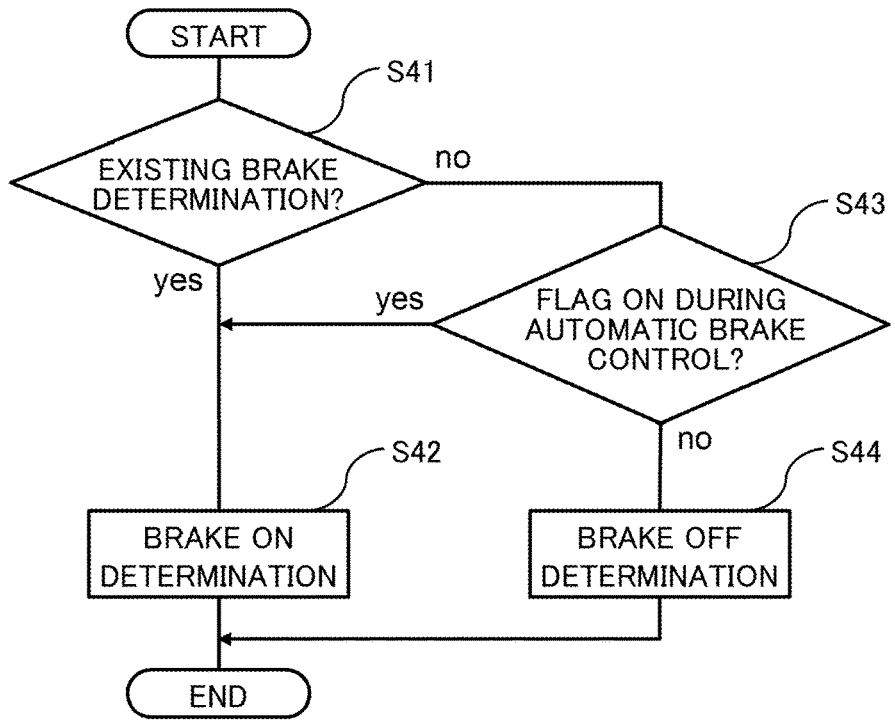

VEHICLE BEHAVIOR CONTROL DEVICE

TECHNICAL FIELD

The present invention relates to a vehicle behavior control device to stabilize vehicle behavior by a yaw moment.

BACKGROUND ART

A vehicle behavior control device is known that stabilizes a vehicle posture while a vehicle is turning, and suppresses vehicle behavior disturbance due to oversteering or understeering. Further, a vehicle behavior control device may separately brake four wheels to stabilize a vehicle posture while turning when the vehicle posture is disturbed in a case of an abrupt steering operation due to a sudden change of road conditions or hazard avoidance.

The vehicle behavior control device controls, based on a yaw rate of the vehicle, a hydraulic pressure to pressurize one of wheel cylinders in a hydraulic pressure system including a pair of wheel cylinders and suppresses excessive oversteering or understeering, to stabilize the vehicle behavior while the vehicle is turning (for example, see Patent Document 1).

More specifically, when the vehicle behavior control device detects understeering while the vehicle is turning left without a brake pedal being operated, and, a pressure in a wheel cylinder in a rear inner wheel is increased and a pressure in a wheel cylinder in a diagonal (front outer) wheel from the rear inner wheel is reduced. On the other hand, when oversteering is detected, pressures in wheel cylinders in outer (both front and rear) wheels are increased and pressures in wheel cylinders in the diagonal wheels are reduced.

In addition, when the vehicle behavior control device detects understeering while the vehicle is turning left with the brake pedal being operated, the pressure in the wheel cylinder in the rear inner wheel is increased and the pressure in the wheel cylinder in the diagonal (front outer) wheel from the rear inner wheel is adjusted to a master pressure (pressure in a master cylinder). When oversteering is detected, the pressures in the wheel cylinders in the outer (both front and rear) wheels are increased and the pressures in the wheel cylinders in the diagonal wheels are adjusted to the master pressure.

This allows the vehicle behavior to be stabilized when the vehicle is turning left.

PRIOR ART DOCUMENT

Patent Document

Patent document 1: Japanese Patent Application Publication No. 2005-35444

SUMMARY OF THE INVENTION

Problem to be Solved by the Invention

According to the prior art above, the hydraulic pressures in the wheel cylinders in the diagonal wheels are controlled to different states depending on whether the brake is operated.

In general, such determination whether the brake is operated (brake determination) is made in the vehicle behavior control device based on a value of an upstream pressure sensor inside the device.

An electric vehicle (including a hybrid type) does not have a brake booster using an engine intake pressure, and an electric hydraulic pressure brake such as an electric servo brake (ESB (electric servo brake)) is used which generates a brake hydraulic pressure with the use of a power of an electric motor. Therefore, the electric vehicle determines whether the brake is operated based on a driver-requested hydraulic pressure that is calculated from a sensor value of a stroke sensor sent from the electric hydraulic pressure brake. Further, some electric vehicles determine whether the brake is operated based on a select-low operation on a driver-requested hydraulic pressure and an upper stream pressure inside the vehicle behavior control device.

The electric vehicle using an electric hydraulic brake or the like employs a regenerative brake that decelerates the vehicle by using a drive motor for driving the vehicle as a generator, and charges a battery with obtained electricity for reuse. To increase a regenerative energy quantity, some vehicles mounted with the electric hydraulic pressure brake execute regenerative brake cooperative control in which the driver-requested hydraulic pressure is calculated based on a step-in quantity on a brake pedal when the brake is operated, and the driver-requested hydraulic pressure is converted to a brake force that is divided into the regenerative brake and the hydraulic pressure brake.

In this kind of a vehicle, when an accelerator pedal is released without a brake operation, the regenerative brake cooperative control brakes by the regenerative brake that is approximately at the same level as engine brake. However, if a battery is fully charged, the regenerative electricity is not charged to have no brake force generated. Therefore, braking by the electric hydraulic pressure brake is applied in place of the regenerative brake, that is, braking by frictional brake (hydraulic pressure brake) is applied, in which the electric hydraulic pressure brake generates a brake hydraulic pressure regardless of a brake operation by the driver.

Further, when constant speed traveling/inter-vehicle distance automatic control ((ACC (adaptive cruise control)) is in operation, braking by the electric hydraulic pressure brake (hydraulic pressure brake) is applied, though the brake pedal is not operated.

Hereinafter, in the present specification, braking by generating the brake hydraulic pressure regardless of operation on the brake pedal, as described above, is referred to as automatic brake control.

If the conventional vehicle behavior control device is mounted in the electric vehicle, since the upstream pressure sensor value and the driver-requested hydraulic pressure are used for brake determination as described above, brake determination during the automatic brake control described above is determined as the brake not being operated. Then, the vehicle behavior control device provides control by not assuming that the brake hydraulic pressure by the electric hydraulic brake is generated in the state where that the brake is determined as not being operated. Therefore, if the vehicle behavior control device is operated during the automatic brake control, the hydraulic pressures in the wheel cylinders in the diagonal wheels from the braking wheels are reduced, which are supposed to be adjusted to the brake hydraulic pressure. Thus, the vehicle behavior control device may not exhibit essential performance of suppressing for oversteering and understeering (drifting) (vehicle behavior stabilization performance).

In the present specification, oversteering and understeering (drifting) are referred to as vehicle behavior.

An object of the present invention is to provide a vehicle behavior control device that appropriately pressurizes wheel cylinders in diagonal wheels even during the automatic brake control to suppress a vehicle behavior disturbance.

Means for Solving the Problem

A vehicle behavior control device according to claim 1 for use in a vehicle including: a brake pedal; a master cylinder that generates a hydraulic pressure in response to an operation with the brake pedal; an electrical hydraulic pressure generator that is connected to the master cylinder and electrically generates a hydraulic pressure based on the operation with the brake pedal; and a wheel cylinder that is arranged in each wheel of the vehicle for braking, wherein the vehicle behavior control device controls a brake hydraulic pressure to be applied to the wheel cylinder so as to control behavior of the vehicle, and wherein, in a case where brake control is executed such that a brake hydraulic pressure not in response to the operation with the brake pedal is generated if the brake pedal is not being operated, a hydraulic pressure applied to a wheel cylinder in a diagonal wheel that is positioned diagonal from a brake wheel for controlling the behavior of the vehicle is adjusted to the hydraulic pressure in the master cylinder.

According to the vehicle behavior control device described above, the hydraulic pressure to be applied to the wheel cylinder in the diagonal wheel that is positioned diagonal from the brake wheel for controlling the behavior of the vehicle is adjusted to the brake hydraulic pressure in the master cylinder on both of a case in which the brake pedal is being operated and a case in which another brake control other than the brake control with the brake pedal.

Further, when the hydraulic pressure generated in the electrical hydraulic pressure generator is equal to the predetermined pressure or above, in the vehicle behavior control device according to claim 2, in addition to the invention as claimed in claim 1, adjusts the hydraulic pressure applied to the wheel cylinder in the diagonal wheel that is positioned diagonal from the brake wheel for controlling the behavior of the vehicle to the hydraulic pressure in the master cylinder.

The vehicle behavior control device as described above executes another predetermined brake control other than the brake control with the brake pedal such as constant speed traveling/inter-vehicle distance automatic control (ACC) and regenerative brake cooperative control at full charge, wherein the hydraulic pressure applied to the wheel cylinder in the diagonal wheel that is positioned diagonal from the brake wheel for controlling the behavior of the vehicle is adjusted to the hydraulic pressure in the master cylinder.

Effect of the Invention

The present invention improves performance of a vehicle behavior control device for suppressing a vehicle behavior disturbance.

BRIEF DESCRIPTION OF THE DRAWINGS

FIG. 2 is a diagram showing peripheral structures of an ECU in the vehicle behavior control device;
FIG. 3 is a flowchart showing how to change control contents in vehicle behavior control in a first embodiment;
and FIG. 4 is a flowchart showing how to change control contents in the vehicle behavior control in a second embodiment.

EMBODIMENTS FOR CARRYING OUT THE INVENTION

Figure 1:
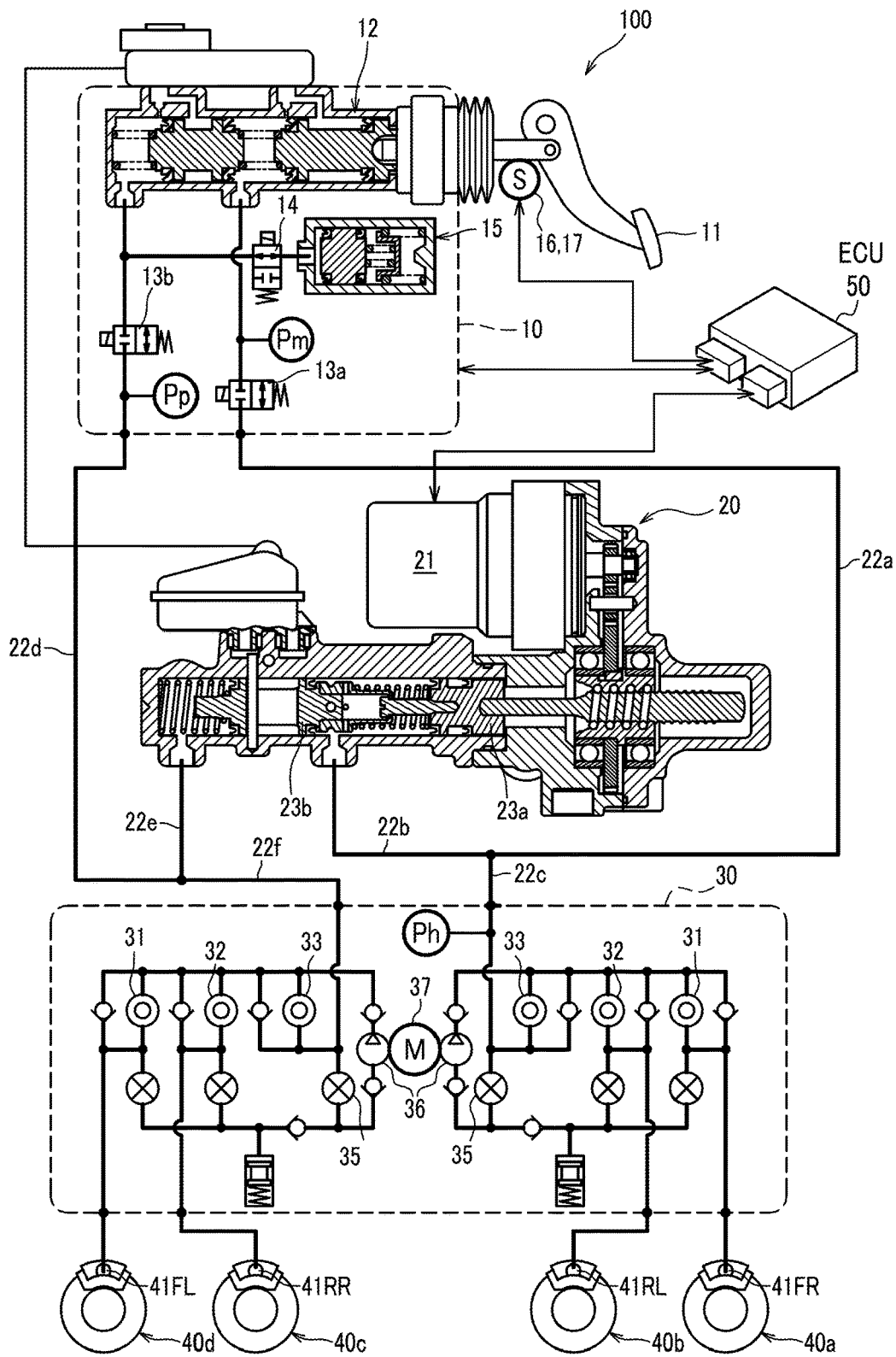
FIG. 1 is a diagram showing a structure of a vehicle behavior control device according to an embodiment.

Hereinafter, embodiments of the invention will be described in detail with reference to the drawings.

FIG. 1 is a diagram showing a structure of a vehicle behavior control device according to an embodiment. A hydraulic pressure brake system 100 includes a by-wire brake system for generating a brake force through electric circuits, in addition to an existing brake system for generating a braking force through hydraulic circuits.

The hydraulic pressure brake system 100 includes, as shown in FIG. 1: a hydraulic pressure generator 10 that is inputted with a brake force operation (inclusive of a brake applying operation and a brake releasing operation) by a driver via a brake pedal 11; an electrical hydraulic pressure generator 20 (hereinafter, referred to as a motor cylinder device) that generates a brake hydraulic pressure based on electric signals in response to at least the brake operation; a main body 30 of a vehicle behavior control device that supports stabilizing vehicle behavior based on the brake hydraulic pressure generated by the motor cylinder device 20; disk brake mechanisms 40a to 40d; and an ECU (Electronic Control Unit) 50 for brake control. The hydraulic pressure generator 10 and the motor cylinder device 20 as the by-wire brake system are electrically connected to the ECU 50 via electric wires. Note that the ECU 50 serves as control circuit of the vehicle behavior control device.

The hydraulic pressure generator 10, the motor cylinder device 20 and the main body 30 of the vehicle behavior control device are fluidly connected with one another through pipe tubes 22a to 22f in which brake fluid flows.

The hydraulic pressure generator 10 includes a master cylinder 12 that converts a pedaling force inputted by the driver with a brake pedal 11 into a brake hydraulic pressure, a first shut-off valve 13a, a second shut-off valve 13b, a third shut-off valve 14 and a stroke simulator 15. Note that the stroke simulator 15 is an element that solves a problem such that, when the first shut-off valve 13a and the second shut-off valve 13b are shut off, a brake fluid out of the master cylinder 12 by the brake pedal 11 being stepped on has no place to flow to and the driver feels no "stepping response" when stepping on the brake pedal 11.

The motor cylinder device 20 generates a brake hydraulic pressure in accordance with, or separated from, the brake hydraulic pressure generated in the master cylinder 12. The motor cylinder device 20 includes a first slave piston 23a and a second slave piston 23b for generating the brake hydraulic pressure by receiving a rotational driving force of the electric motor 21.

Note that the motor cylinder device 20 is not limited to the above structure, but it may be a device that generates a predetermined brake hydraulic pressure based on electric signals caused by a braking operation, an automatic braking by the ECU 50, or the like. In this embodiment, this kind of device is collectively referred to as an electric hydraulic pressure generator.

The main body 30 of the vehicle behavior control device includes inlet valves 31 and 32, regulator valves 33, suction valves 35, pumps 36 for pressurizing the brake fluid, an electric motor 37 that drives the pumps 36, and the like.

As operation detectors that detect the operation on the brake pedal 11, brake hydraulic pressure sensors Pm, Pp, Ph that detect the brake hydraulic pressure generated in the master cylinder 12, a brake switch 16, and a stroke sensor 17 are included. At least either one of them can detect the operation on the brake pedal 11.

<Basic Operation of the Hydraulic Pressure Brake System 100>

Next, a basic operation of the hydraulic pressure brake system 100 will be described.

In a case where the motor cylinder device 20 and the ECU 50 (see FIG. 2) for by-wire control normally operate, when the driver steps on the brake pedal 11, a so-called "by-wire" brake system is activated. Specifically, in the normally operating the hydraulic pressure brake system 100, when the driver steps on the brake pedal 11, the brake hydraulic pressure generated by the motor cylinder device 20 is used to activate the disk brake mechanisms 40*a* to 40*d*, in a state that the first shut-off valve 13*a* and the second shut-off valve 13*b* shut off the communication between the master cylinder 12 and the disk brake mechanisms 40*a* to 40*d* (wheel cylinders 41FR, 41RL, 41RR, 41FL) that brake respective wheels.

<Peripheral Structure of the ECU>

FIG. 2 is a diagram showing peripheral structures of the ECU 50 in the hydraulic pressure brake system 100. The detailed peripheral structures of the ECU 50 will be described with reference to FIG. 2, and FIG. 1 as needed.

As shown in FIG. 2, the ECU 50 is connected with, as an input system, an ignition key switch 71 (hereinafter referred to as "IG key switch"), a wheel speed sensor 72, the brake switch 16, the stroke sensor 17, an accelerator pedal sensor 73, a yaw rate sensor 74, a longitudinal G sensor 75, a lateral G sensor 76, the brake hydraulic pressure sensors Pm, Pp, Ph, and an EPB setting switch 77. Note that an EPB (Electronic Parking Brake) is an electrically driven parking brake.

The IG key switch 71 is operated when the power is supplied from a vehicle-mounted battery (not shown) to respective parts of the vehicle. When the IG key switch 71 is turned on, the power is supplied to the ECU50 for activation.

The wheel speed sensor 72 serves to detect rotational speed (wheel speed) of each wheel. A wheel speed signal for each wheel detected by the wheel speed sensor 72 is sent to the ECU 50.

The brake switch 16 serves to detect whether the brake pedal 11 is stepped on. The stroke sensor 17 serves to detect an operation (stroke) quantity of the brake pedal 11 by the driver. Signals detected by the brake switch 16 and the stroke sensor 17 are sent to the ECU 50.

The accelerator pedal sensor 73 serves to detect an operation quantity of an accelerator pedal (not shown) by the driver. The signals on the operation quantity of the accelerator pedal detected by the accelerator pedal sensor 73 are sent to the ECU 50.

The yaw rate sensor 74 serves to detect a yaw rate generated in the vehicle. Signals on the yaw rate detected by the yaw rate sensor 74 are sent to the ECU 50.

The longitudinal G sensor 75 as acceleration sensor serves to detect longitudinal G (longitudinal acceleration) generated in the vehicle. Signals on the longitudinal G detected by the longitudinal G sensor 75 are sent to the ECU 50.

The lateral G sensor 76 as acceleration sensor serves to detect lateral G (lateral acceleration) generated in the vehicle. Signals on the lateral G detected by the lateral G sensor 76 are sent to the ECU 50.

The brake hydraulic pressure sensors Pm, Pp, Ph serve to detect the hydraulic pressures in respective parts including the pipe tubes 22*a* to 22*f*. Signals on the brake hydraulic pressures respectively detected by the brake hydraulic pressure sensors Pm, Pp, Ph are sent to the ECU 50.

The EPB setting switch 77 is arranged such as in an instrument panel in a cabin and is operated when the EPB (EPB motors 82) is turned on or off.

Further, as shown in FIG. 2, the ECU 50 is connected with, as an output system, a speaker 81 used to inform various pieces of information, the electric motor 21 of the motor cylinder device 20, the first shut-off valve 13*a*, the second shut-off valve 13*b*, the third shut-off valve 14, the electric motor 37, and the EPB motors 82 provided on respective disc brake mechanisms 40*a* to 40*d* for driving a parking mechanism (not shown) to activate calipers (not shown).

The ECU 50 is configured with a microcomputer having a CPU (Central Processing Unit), a ROM (Read Only Memory), a RAM (Random Access Memory) and the like. The microcomputer retrieves and executes programs and data stored in the ROM and the RAM.

In the present embodiment, the ECU 50 includes a brake determination part 501, and a control part 502 for the vehicle behavior control device that controls the main body 30 of the vehicle behavior control device, so as to appropriately pressurize the wheel cylinders if the vehicle suffers a behavior disturbance during automatic brake control.

Control contents in the vehicle behavior control will be described in detail below.

First Embodiment

First, in the brake determination part 501, a select-high operation is executed on the driver-requested hydraulic pressure calculated based on the sensor value of the stroke sensor 17 and a required brake hydraulic pressure to be generated in the motor cylinder device 20, to determine whether the automatic brake control is in operation. How to change the control contents in the vehicle behavior control will be described with reference to FIG. 3.

In S31 in FIG. 3, the select-high operation is executed on the driver-requested hydraulic pressure calculated based on the sensor value of the acceleration pedal sensor 73 and the required brake hydraulic pressure to be generated in the motor cylinder device 20. As a result, it is determined whether the driver-requested hydraulic pressure (brake hydraulic pressure based on the value of the stroke sensor 17) is greater than the required brake hydraulic pressure (brake hydraulic pressure to be generated in the motor cylinder device 20) (driver-requested hydraulic pressure>required brake hydraulic pressure). That is, whether the driver-requested hydraulic pressure is greater is determined. The required brake hydraulic pressure includes the brake hydraulic pressure during the automatic brake control.

In S31, if the driver-requested hydraulic pressure is greater than (>) the required brake hydraulic pressure (Yes in S31), the process proceeds to S32.

In S32, the control part 502 for the vehicle behavior control device is notified so as to control as the brake ON.

With this procedure, the main body 30 of the vehicle behavior control device that is controlled by the control part 502 for the vehicle behavior control device controls to suppress the vehicle behavior disturbance while braking with a conventional brake pedal operation by the driver.

In S31, if the driver-requested hydraulic pressure (brake hydraulic pressure based on the value of the stroke sensor 17) is not greater than the required brake hydraulic pressure (brake hydraulic pressure generated in the motor cylinder device 20) (No in S31), the process proceeds to S33 (driver-requested hydraulic pressure required brake hydraulic pressure).

In S33, it is determined whether the required brake hydraulic pressure generated in the motor cylinder device 20 is equal to a predetermined threshold value or above. The threshold value for determination is used for determining that the braking is caused by the automatic brake control while the vehicle behavior control is in operation. The value is, for example, 0.2 MPa.

In S33, if the required brake hydraulic pressure is 0.2 MPa or above (Yes in S33), the process proceeds to S32. Accordingly, the braking caused by the automatic brake control while the vehicle behavior control is in operation is determined as conventional braking operation. In S32, the control part 502 for the vehicle behavior control device is notified to control as the brake ON.

In S33, if the required brake hydraulic pressure is less than 0.2 MPa (No in S33), the process proceeds to S34.

In S34, the control part 502 for the vehicle behavior control device is notified to control as the brake OFF.

With this procedure, the main body 30 of the vehicle behavior control device that is controlled by the control part 502 for the vehicle behavior control device controls the vehicle behavior during the automatic brake control in which the driver does not operate the brake pedal as in a conventional case.

With the procedure above, even during the automatic brake control, when it is determined as the brake ON, the pressures in wheel cylinders in the diagonal wheels from the control wheels are controlled as in a case where the vehicle behavior is controlled during braking with the brake pedal. This prevents the conventional problem of unstable vehicle behavior due to depressurized wheel cylinders in the diagonal wheels.

More specifically, during the automatic brake control, the pressures in the wheel cylinders in the diagonal wheels are controlled so as to be added with the hydraulic pressure generated in the motor cylinder device 20. On the other hand, when the brake pedal is not operated, the first shut-off valve 13*a* and the second shut-off valve 13*b* described in FIG. 1 are opened, so that the master cylinder 12 is in communication with the motor cylinder device 20. Therefore, the hydraulic pressure generated in the motor cylinder device 20 is equal to that in the master cylinder, and it can be said that the pressures applied to the wheel cylinders in the diagonal wheels are adjusted to the hydraulic pressure in the master cylinder. Further, the first shut-off valve 13*a* and the second shut-off valve 13*b* may be closed during the automatic brake control, and the hydraulic pressures applied to the wheel cylinders in the diagonal wheels may be adjusted to the hydraulic pressure in the master cylinder with the first shut-off valve 13*a* and the second shut-off valve 13*b* being closed.

Further, according to the present embodiment, the vehicle behavior disturbance is suppressed during the automatic brake control, without changing the conventional control contents in the control part 502 for the vehicle behavior control device greatly.

More specifically, the comfortable hydraulic pressure brake system 100 is easily provided that does not disturb the vehicle behavior, even with the electric vehicle under constant speed traveling/inter-vehicle distance automatic control (ACC) and regenerative brake cooperative control at full charge.

Second Embodiment

Next, how to change the control contents in the vehicle behavior control will be described with reference to FIG. 4, in which an automatic brake control flag is prepared to indicate that the vehicle is under the automatic brake control, and the brake determination part 501 determines whether the automatic brake control is applied (flag ON) or not (flag OFF), by referring to the automatic brake control flag.

The automatic brake control flag is set when the hydraulic pressure is generated in the motor cylinder device 20 for braking under the constant speed traveling/inter-vehicle distance automatic control (ACC), the regenerative brake cooperative control, or the like. The flag may be stored in the RAM or the like (not shown in FIG. 2) in the ECU 50.

In S41 in FIG. 4, a conventional brake determination is executed. The conventional brake determination is made, for example, by determining whether the brake is operated with reference to the brake pedal switch 16 or the like.

If it is determined that the conventional brake is being used in S41 (Yes in S41), the process proceeds to S42.

In S42, the control part 502 for the vehicle behavior control device is notified to control as the brake ON.

With this procedure, the main body 30 of the vehicle behavior control device that is controlled by the control part 502 for the vehicle behavior control device suppresses the vehicle behavior disturbance while braking with the conventional brake operation by the driver during the automatic brake control.

If it is determined in S41 that the conventional brake is not being used (No in S41), the process proceeds to S43. In S43, a setting value is determined by referring to the automatic brake control flag.

In S43, if the automatic brake control flag is set to ON (Yes in S43), the process proceeds to S42. This determines being under the automatic brake control as the conventional brake being operated, and the control part 502 for the vehicle behavior control device is notified in S42 to control as the brake ON.

In S43, if the automatic brake control flag is set to OFF (No in S43), the process proceeds to S44.

In S44, the control part 502 for the vehicle behavior control device is notified to control as the brake OFF.

With the procedure, the main body 30 of the vehicle behavior control device that is controlled by the control part 502 for the vehicle behavior control device suppresses the vehicle behavior disturbance in the case where the driver does not operate the conventional brake pedal.

With the procedure above, if it is determined as the brake ON even during the automatic brake control, the pressures in the wheel cylinders in the diagonal wheels from the control wheels are controlled, as in the case where the vehicle behavior is controlled during braking with the brake pedal. This prevents the conventional problem of unstable vehicle behavior due to depressurized wheel cylinders in the diagonal wheels.

More specifically, during the automatic brake control, the pressures in the wheel cylinders in the diagonal wheels are adjusted so as to be added with the hydraulic pressure generated in the motor cylinder device 20. On the other hand, when the brake pedal is not operated, the first shut-off valve 13*a* and the second shut-off valve 13*b* illustrated in FIG. 1 are open, so that the master cylinder 12 is in communication with the motor cylinder device 20. Therefore, the hydraulic pressure generated in the motor cylinder device 20 is equal to that in the master cylinder, so that the hydraulic pressures applied to the wheel cylinders in the diagonal wheels are adjusted to the hydraulic pressure in the master cylinder. Further, the first shut-off valve 13a and the second shut-off valve 13b may be closed during the automatic brake control, and the hydraulic pressures applied to the wheel cylinders of the diagonal wheels may be adjusted to that in the master cylinder with the first shut-off valve 13a and the second shut-off valve 13b being closed.

According to the embodiment, without greatly changing the conventional control contents of the control part 502 for the vehicle behavior control device, the vehicle behavior disturbance during the automatic brake control is prevented.

More specifically, even with the electric vehicle under the constant speed traveling/inter-vehicle distance automatic control (ACC) and regenerative brake cooperative control at full charge, the comfortable hydraulic pressure brake system 100 is easily provided that does not disturb the vehicle behavior.

Third Embodiment

In the above first and second embodiments, the cases are described in which the brake determination part 501 is provided, and when the main body 30 of the vehicle behavior control device is being operated for braking, it is determined whether the automatic brake control is being used, to control to increase the pressures in the wheel cylinders in the diagonal wheels. In the present embodiment, a case will be described in which the control part 502 for the vehicle behavior control device controls to increase the pressures in the wheel cylinders in the diagonal wheels.

In an electric vehicle with a by-wire brake system, the main body 30 of the vehicle behavior control device cannot determine, based on a hydraulic pressure measured with the brake hydraulic pressure sensor Ph, whether the brake hydraulic pressure is generated in the motor cylinder device 20 either with the brake pedal operation by the driver or by the automatic brake control.

Then, regardless of the brake determination, the wheel cylinders in the diagonal wheels are set in a pressure adjustment mode to prevent the pressures from being unnecessarily reduced.

More specifically, the main body 30 of the vehicle behavior control device actuates the pumps 36 for pressurizing the brake fluid, in a state that the suction valves 35 are energized to open in FIG. 1, for sucking the brake fluid from the reservoir in the master cylinder 12 through the suction valves 35 to generate the brake hydraulic pressure at the upstream of the inlet valves 31, 32. The regulator valves 33 are excited so as to be opened at a predetermined opening to adjust the brake hydraulic pressure, and the inlet valves 31 or 32 corresponding to the control wheels to control the vehicle behavior are opened, so that the brake hydraulic pressure is transmitted to the wheel cylinders in the control wheels. Thus, the braking force is applied to the braking wheels to generate a yaw moment that suppresses the vehicle behavior disturbance.

At this time, if the brake hydraulic pressure is generated in the motor cylinder device 20 either with the brake pedal operated by the driver or by the automatic brake control, the brake hydraulic pressure is added to the hydraulic pressure generated by the pumps 36 at the upstream of the inlet valves 31 and 32.

The hydraulic pressure at the upstream of the inlet valves 31 or 32 is adjusted to the hydraulic pressure in the master cylinder through the inlet valves 31 or 32 and the corresponding outlet valves, and then, is applied to the wheel cylinders in the diagonal wheels.

For wheels that are not controlled for the vehicle behavior, when the wheel cylinders in the wheels are not applied with the brake hydraulic pressure, the inlet valves 31, 32 are closed, and when the wheel cylinders in the wheels are applied with the brake hydraulic pressure, the inlet valves 31, 32 are opened to transmit the brake hydraulic pressure.

Thus, regardless of the brake determination, the hydraulic pressure applied to the wheel cylinders in the diagonal wheels are adjusted to the hydraulic pressure in the master cylinder.

Further, the control part 502 for the vehicle behavior control device may determine whether the brake hydraulic pressure detected by the brake hydraulic pressure sensor Ph is equal to a predetermined value or below, and if it is determined that the brake hydraulic pressure is less than the predetermined value, the wheel cylinders in the diagonal wheels may be depressurized.

More particularly, the brake hydraulic pressure sensor Ph measures the brake hydraulic pressure and the control part 502 for the vehicle behavior control device determines whether the measured brake hydraulic pressure is less than the predetermined threshold value. The predetermined determination threshold value is, for example, 0.2 MPa.

In the above determination, if the measured brake hydraulic pressure is less than the predetermined threshold value, the outlet valves in the diagonal wheels from the control wheels that control the vehicle behavior are opened in a state that transmission of the brake hydraulic pressure is shut off. This reduces the pressure by releasing the brake hydraulic pressure in the wheel cylinders to the reservoir.

In the above determination, if the measured brake hydraulic pressure is equal to the predetermined threshold value or above, the inlet valves and the outlet valves in the wheel cylinders in the diagonal wheels from the control wheels that control the vehicle behavior are controlled to be opened/closed. This adjusts the pressures in the wheel cylinders in the diagonal wheels to the hydraulic pressure in the master cylinder.

According to the embodiment, regardless of the brake determination, the hydraulic pressures in the wheel cylinders in the diagonal wheels are adjusted based on the brake hydraulic pressure, to prevent unnecessary pressure reduction during the automatic brake control, and the vehicle behavior control device that suppresses the vehicle behavior disturbance is provided.

DESCRIPTION OF REFERENCE NUMERALS 10 hydraulic pressure generator
11 brake pedal
12 master cylinder
13a first shut-off valve
13b second shut-off valve
14 third shut-off valve
15 stroke simulator
16 brake switch
17 stroke sensor
20 motor cylinder device (electric hydraulic pressure generator)
21 electric motor
30 main body of a vehicle behavior control device
36 pump
37 electric motor
50 ECU
100 hydraulic pressure brake system
Pm, Pp, Ph brake hydraulic pressure sensor

The invention claimed is:

1. A vehicle behavior control device for use in a vehicle comprising: a brake pedal;
- a master cylinder that generates a hydraulic pressure in response to an operation with the brake pedal;
- an electrical hydraulic pressure generator that is connected to the master cylinder and electrically generates a hydraulic pressure based on the operation with the brake pedal; and
- a wheel cylinder that is arranged in each wheel of the vehicle for braking,
- wherein the vehicle behavior control device controls a brake hydraulic pressure to be applied to the wheel cylinder so as to control behavior of the vehicle, and
- wherein, in a case where brake control is executed such that a brake hydraulic pressure not based on the operation with the brake pedal is generated if the brake pedal is not being operated, a hydraulic pressure applied to a wheel cylinder in a diagonal wheel that is positioned diagonal from a brake wheel for controlling the behavior of the vehicle is adjusted to the hydraulic pressure in the master cylinder.

2. The vehicle behavior control device according to claim 1, wherein, when the hydraulic pressure generated in the electrical hydraulic pressure generator is equal to a predetermined pressure or above, the hydraulic pressure applied to the wheel cylinder in the diagonal wheel that is positioned diagonal from the brake wheel for controlling the behavior of the vehicle is adjusted to the hydraulic pressure in the master cylinder.

* * * * *